UNITED STATES PATENT OFFICE

2,554,274

INSECTICIDAL COMPOSITIONS

Herschel G. Smith, Wallingford, Mark L. Hill, Boothwyn, and Troy L. Cantrell, Lansdowne, Pa., assignors to Gulf Oil Corporation, Pittsburgh, Pa., a corporation of Pennsylvania No Drawing. Application June 2, 1948, Serial No. 30,738

14 Claims. (Cl. 167—24)

This invention relates to insecticidal compositions, and more particularly, to insecticidal compositions which are stabilized and benefited by the inclusion therein of certain novel additives.

The compounding and use of modern insecticidal compositions is complicated by a variety of difficulties which are presented by even the most carefully compounded insecticides. Of these difficulties, one of the most serious is that of deterioration which, of course, is almost inevitably accompanied by a loss of killing power. Many insecticides tend to deteriorate upon aging, and frequently such aging is accompanied by the formation of haziness in the composition followed by precipitation of some of the toxic ingredients or decomposition products thereof. In addition, the deterioration of many insecticides, particularly those comprised of pyrethrins or halogen containing compounds, such as DDT, is noticeably hastened by the action of light rays and by oxidation. Furthermore, such action operates to increase the corrosive tendency of the insecticides, this tendency being a serious problem in itself.

As desirable as it is to alleviate the above difficulties, it is equally desirable to increase the killing power of the toxicants used in insecticides. This is sometimes accomplished by means of appropriate additives termed synergists. The phenomenon of synergism is well known in the art, and, although the exact mechanism to explain the synergistic effects of many compounds is not fully known, the use of synergists is widely practiced.

Accordingly, this invention has as an object the provision of insecticidal compositions of enhanced killing power.

A further object is to provide compositions containing compounds capable of synergizing the killing properties of insecticidal toxicants.

Another object is to provide insecticidal compositions which are stabilized against the reduction of killing power due to aging and the action of light rays.

Another object is to provide compositions of the character described which will have a reduced hazing tendency.

A further object is to provide insecticidal compositions which have been stabilized against corrosion tendencies.

These and other objects are accomplished by the present invention wherein we provide insecticidal compositions comprising one or more insecticide toxicants, a solvent therefor, and an oil-soluble metal salt having the following formula:

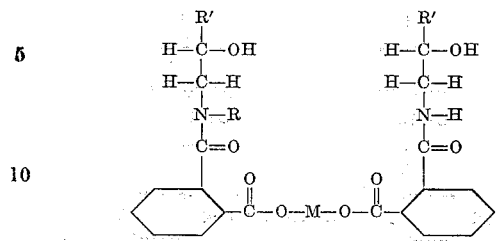

wherein M is a divalent metal, such as calcium, R is an alkyl group containing from 8 to 22 carbon atoms, and R' is hydrogen or an alkyl group, advantageously a short chain alkyl group. Our insecticidal additives therefore, are substantially neutral divalent metal salts of ortho phthalamidic acids containing two alkyl groups attached to the nitrogen atom thereof, one being a hydroxylated alkyl group and the other a long chain alkyl group.

These insecticidal additives are readily soluble in the petroleum solvents ordinarily used as bases for insecticides. Most of them are viscous oily liquids at ordinary temperatures and can be readily incorporated in various naphthas and heavier mineral oils, including paraffinic as well as naphthenic and mixed base oils.

These additives may advantageously be prepared in situ in a mineral oil, direct from divalent metal hydroxides, phthalic anhydride and secondary aliphatic amines having the following formula:

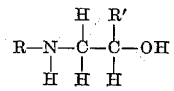

wherein R' represents hydrogen or an alkyl group, and R represents an alkyl group containing from 8 to 22 carbon atoms. In turn, these secondary alkyl amines containing a hydroxyl group attached to one of the alkyl groups thereof can be readily prepared by reacting equimolecular amounts of alkylene oxides, such as ethylene oxide, propylene oxide, butylene oxide, and the like, with primary alkyl amines having the following formula:

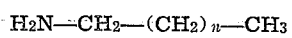

wherein $n$ is a number from 6 to 20. Some of the primary alkyl amines of this generic class are mono-capryl amine, mono-lauryl amine, mono-myristyl amine, mono-palmityl amine and mono-stearyl amine. Mixtures of the primary amines may also be employed with good results. For instance, one commercially available mixture of such primary fatty amines is the so-called "cocoamine." Commercial cocoamine has an average molecular weight of 210 and contains primarily lauryl amine and minor amounts of its homologues.

In preparing the insecticidal additives of the present invention, the above-mentioned secondary amines are reacted with phthalic anhydride in substantially equimolecular amounts to form a monoamide of phthalic acid, namely, the desired N-alkyl, N-alkylol ortho phthalamidic acid, which is then neutralized by reacting with lime to form substantially neutral lime salts thereof. In lieu of lime, other hydroxides of divalent metals may be employed such as magnesium hydroxide, barium hydroxide and the like. As mentioned above, the metal salts of the present invention may advantageously be prepared in situ in a deodorized naphtha of a quantity sufficient to dissolve the resultant reaction product.

By way of example, a preferred compound of the present invention was prepared as follows. All parts are by weight. 1640 parts of an insecticide naphtha, there were added with stirring 296 parts of phthalic anhydride and 74 parts of hydrated lime. The lime-phthalic anhydride-oil slurry was stirred as 486 parts of dodecyl propanol amine were added during the course of one hour, while maintaining the temperature at 150° F. under reflux conditions. After the lime and phthalic anhydride had gone into solution, the temperature was raised to 280° F. and held at that temperature for a period of two hours to complete the reaction. The mixture was then cooled and filtered to remove any excess lime. The resultant product has the following properties:

Gravity, °API _____ 38.9
Ash as sulfate, percent _____ 6.02

The product obtained is a concentrate of the additive of our invention in a naphtha solution, and may be diluted down to the desired proportion with the same or other naphthas or other solvents. For example, this concentrate may be readily incorporated in mineral naphtha base insecticides, the product contained therein being a neutral calcium salt of N-dodecyl, N-propanol ortho phthalamidic acid having the following formula:

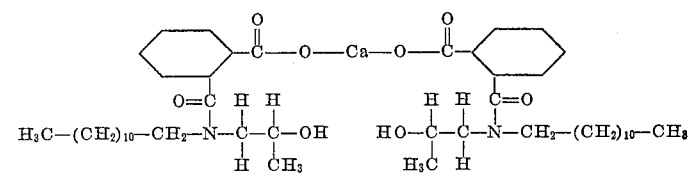

The deodorized naphtha which was used to prepare the above concentrate, and which may be used as a solvent for our insecticidal compositions, had the following properties:

Gravity, °API _____ 50.4
Flash, TCC, °F _____ 154
Cloud, °F _____ —30
Color, Saybolt _____ +30
Appearance _____ Clear
Doctor _____ Good
Odor _____ V. s. pet.
Sulfur, L, percent _____ 0.03

Flock test, Method 130.1, Gov't _____ OK
Copper strip test, 122° F., 3 hr _____ Passes
Neutralization No _____ Nil
Acid heat, °F _____ 1
Iodine No., mod. Hanus _____ 0.5
Aniline point, °F _____ 170.6
Distillation, naphtha, ASTM D86–46:
 Over point, °F _____ 376
 End point, °F _____ 493
 10% at °F _____ 395
 20% at °F _____ 401
 30% at °F _____ 408
 40% at °F _____ 415
 50% at °F _____ 422
 60% at °F _____ 430
 70% at °F _____ 441
 80% at °F _____ 453
 90% at °F _____ 470
 Recovery, percent _____ 98
 Residue, percent _____ 1
 Loss, percent _____ 1

Other carbon hydrocarbon solvents may advantageously be used in accordance with the present invention, both as a solvent in the preparation of the concentrate and as a solvent in the final insecticide composition. These include lubricating oils of light viscosity, alkyl naphthalenes, such as alpha methyl naphthalene, and the like. For compositions adapted for the purpose of treating animals to repel and kill insects, such as a livestock oil spray, a petroleum fraction of the following properties may be used:

Gravity, °API _____ 38.2
Viscosity, SUV, 100° F _____ 45.0
Flash, OC, °F _____ 280
Fire, OC, °F _____ 310
Pour, °F _____ —12
Unsulfonated residue _____ 95.0
Distillation, ASTM D447–41:
 Over point, °F _____ 534
 10% at °F _____ 555
 50% at °F _____ 584
 90% at °F _____ 671
 95% at °F _____ 695

The stability of insecticidal toxicants and the killing power thereof are enhanced by the additives of this invention. Thus, various insecticidal compositions containing toxicants such as pyrethrins, DDT, as well as mixtures thereof, may be improved by employing the additives of our invention.

This invention is further illustrated by the compositions in the table. The results obtained with various insecticides containing the substantially neutral calcium salt of N-dodecyl, N-propanol ortho phthalamidic acid described above are there compared with similar insecticides which lack such an ingredient. The active ingredients are expressed as per cent by volume of the various solutions admixed. The fly killing test, Gulf Method 223, is set forth in detail in U. S. Patent No. 2,421,223.

Table

| Insecticide | I | II | III | IV | V | VI |
|---|---|---|---|---|---|---|
| Make-up, per cent by Vol.: | | | | | | |
| Insecticide Naphtha | | | | 34.330 | 81.67 | |
| 100 Mg. Primary Pyrethrum Extract | 100 | | 95.0 | 60.000 | | |
| 200 Mg. Primary Pyrethrum Extract | | 100 | | | | 99.5 |
| Agent Prepared According to Example of this Invention | | | 5.0 | 5.000 | 5.0 | 0.5 |
| 30 Mg. DDT Solution in Naphtha | | | | 0.670 | 13.33 | |
| Inspection: | | | | | | |
| Gravity, °API | 49.9 | 49.9 | 48.8 | 48.0 | 40.8 | 49.8 |
| Corrosion Test ASTM D665-46T Water, 140° F., 48 Hr. Steel Rod— | | | | | | |
| Appearance | rust | rust | bright | bright | bright | bright |
| Area Rusted, Per Cent | 100 | 100 | 0 | 0 | 0 | 0 |
| Ultra-Violet Light Stability Quartz Tube, 8 Hr | hazy | hazy | bright | bright | bright | bright |
| Fly Killing Test Method 223, Gulf: | | | | | | |
| No. of Tests | 10 | 10 | 10 | 10 | 10 | 10 |
| No. of Flies | 1,012 | 918 | 964 | 926 | 1,037 | 974 |
| Temperature, °F | 84 | 83 | 83 | 83 | 79 | 79 |
| Relative Humidity, Per Cent | 55 | 61 | 56 | 56 | 52 | 52 |
| Average Tests: | | | | | | |
| Down, 10 Min., Per Cent | 94 | 99 | 97 | 97 | 99 | 99 |
| Killed, 24 Hr., Per Cent | 54 | 77 | 68.1 | 92.9 | 96.2 | 88.6 |
| Difference between Kill of Test Sample and Official Test Insecticide (NAIDM) [1] | +6 | +28 | +20.0 | +44.9 | +48.2 | +40.6 |

[1] National Association of Insecticide and Disinfectant Manufacturers, Inc., New York, N. Y.

A comparison of the results of the tests performed on compositions I and II with those performed on compositions III and VI shows that pyrethrins are stabilized against deterioration due to ultra-violet light, that the kill of pyrethrin toxicants is enhanced, and that the corrosiveness of the insecticide compositions is obviated by the additive of the present invention. Further, a comparison of the results of tests performed on compositions I and II with the results of tests performed on compositions IV and V permits of similar conclusions for insecticides containing pyrethrins and/or DDT and the calcium N-alkyl, N-alkylol ortho phthalamidic acid salt of our invention. A solution containing only the additives of our invention in naphtha failed to show any appreciable advantage in kill over the naphtha alone.

Relatively minor proportions of our additives, such as from 0.01 to 5.0 per cent by weight of the insecticidal compositions, are effective, but larger proportions, up to 10.0 per cent by weight, may advantageously be employed.

Compositions prepared in accordance with the present invention are effective against roaches, and other household pests, such as silver fish, ants, bed bugs, and the like, as well as flies.

The DDT referred to hereinabove is chiefly bis - 2,2 - dichlorodiphenyl-1,1,1-trichloroethane. Other halogen containing toxicants with which the divalent metal salts of N-alkyl, N-alkylol phthalamidates may effectively be used, include the hydrocarbon chloride $C_{10}H_6Cl_8$ (known as Chlordane or 1,2,4,5,6,7,8,8-octachlor-4,7-methano - 3 - alpha, 4,7,7 - alpha - tetrahydroindane), gamma hexachloro cyclohexane, dichloro diphenyl dichloroethane, and bis - 2,2 - difluorodiphenyl - 1,1,1-trichloroethane.

The above description and specific examples are intended to be illustrative of the invention only, and many different embodiments may be made without departing from the spirit and scope thereof.

What we claim is:

1. An insecticidal composition comprising a pyrethrins insecticide toxicant, a toxicant selected from the group consisting of bis-2,2-dichlorodiphenyl-1,1,1-trichloroethane, chlordane, gamma hexachloro cyclohexane, dichloro diphenyl dichloroethane, and bis - 2,2 - difluorodiphenyl - 1,1,1-trichloroethane, a solvent therefor, and a divalent metal salt of an N-alkyl, N-alkylol, ortho phthalamidic acid, said metal salt having the following formula:

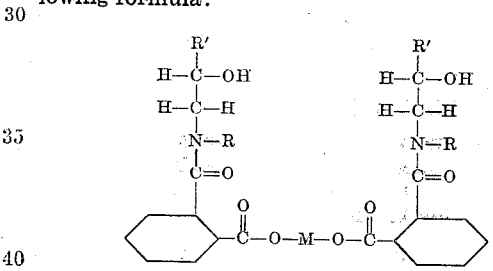

wherein M is a divalent metal, R is an alkyl group containing from 8 to 22 carbon atoms and R' is selected from the group consisting of hydrogen and alkyl.

2. An insecticidal composition comprising a pyrethrins insecticide toxicant, a toxicant selected from the group consisting of bis-2,2-dichlorodiphenyl-1,1,1-trichloroethane, chlordane, gamma hexachloro cyclohexane, dichloro diphenyl dichloroethane, and bis - 2,2 - difluorodiphenyl - 1,1,1 - trichloroethane, a hydrocarbon solvent therefor, and a calcium N-alkyl, N-alkylol phthalamidic acid salt having the following formula:

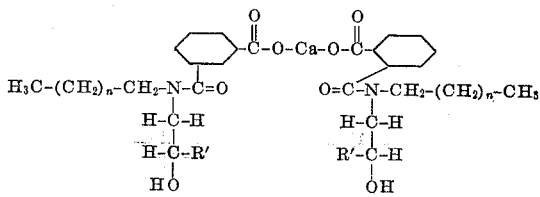

wherein R' is selected from the group consisting of hydrogen and alkyl, and $n$ is a number from 6 to 20.

3. An insecticidal composition comprising a pyrethrins insecticide toxicant, a toxicant selected from the group consisting of bis-2,2-dichlorodiphenyl-1,1,1-trichloroethane, chlordane, gamma hexachloro cyclohexane, dichloro diphenyl dichloroethane, and bis-2,2-difluorodiphenyl-1,1,1-trichloroethane, a hydrocarbon solvent therefor, and a substantially neutral calcium salt of N-dodecyl, N-propanol ortho phthalamidic acid having the following formula:

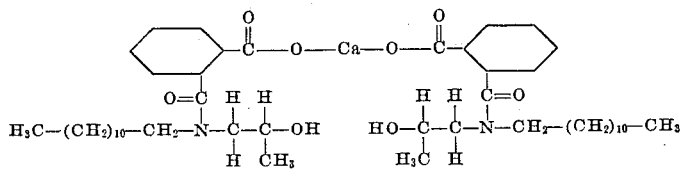

4. An insecticidal composition comprising a pyrethrin insecticide toxicant, a solvent therefor, and a divalent metal salt of an N-alkyl, N-alkylol, ortho phthalamidic acid, said metal salt having the following formula:

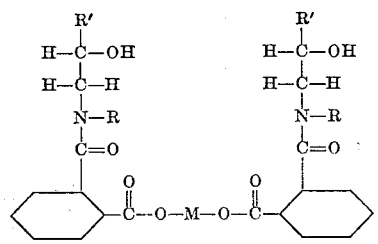

wherein M is a divalent metal, R is an alkyl group containing from 8 to 22 atoms and R' is selected from the group consisting of hydrogen and alkyl.

5. An insecticidal composition comprising the toxicants bis-2,2,-dichlorodiphenyl-1,1,1-trichloroethane and pyrethrins, a solvent therefor, and a divalent metal salt of an N-alkyl, N-alkylol, ortho phthalamidic acid, said metal salts having the following formula:

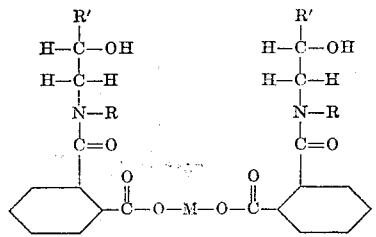

wherein M is a divalent metal, R is an alkyl group containing from 8 to 22 atoms and R' is selected from the group consisting of hydrogen and alkyl.

6. An insecticidal composition comprising a pyrethrin insecticide toxicant, a hydrocarbon solvent therefor, and a calcium N-alkyl, N-alkylol phthalamidic acid salt having the following formula:

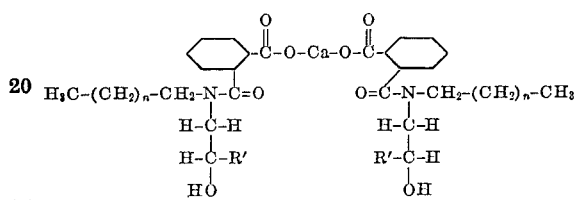

wherein R' is selected from the group consisting of hydrogen and alkyl, and $n$ is a number from 6 to 20.

7. An insecticidal composition comprising the toxicants bis-2,2-dichlorodiphenyl-1,1,1-trichloroethane and pyrethrins, a hydrocarbon solvent therefor, and a calcium N-alkyl, alkylol phthalamidic acid salt having the following formula:

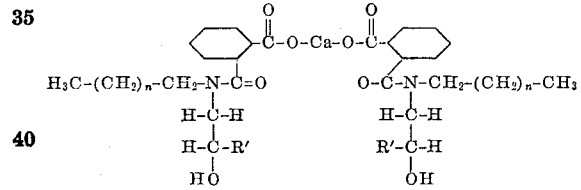

wherein R' is selected from the group consisting of hydrogen and alkyl, and $n$ is a number from 6 to 20.

8. An insecticidal composition comprising a pyrethrin insecticide toxicant, a hydrocarbon solvent therefor, and a substantially neutral calcium salt of N-dodecyl, N-propanol ortho phthalamidic acid having the following formula:

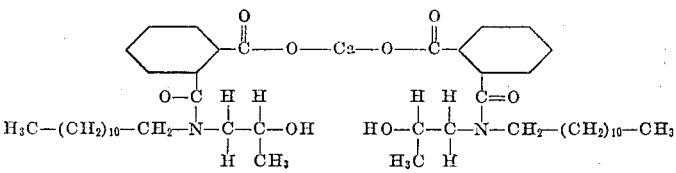

9. An insecticidal composition comprising the toxicants bis-2,2,dichlorodiphenyl-1,1,1-trichlorethane and pyrethrins, a hydrocarbon solvent therefor, and a substantially neutral calcium salt of N-dodecyl, N-propanol ortho phthalamidic acid having the following formula:

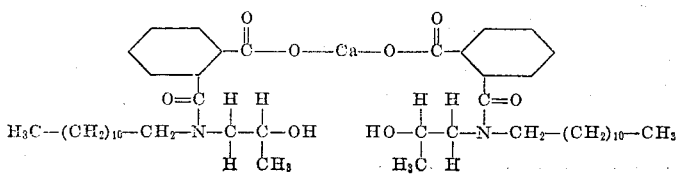

10. The composition of claim 3 wherein the said insecticidal composition contains from 0.01 to 10 per cent by weight of said divalent metal salt of an N-alkyl, N-alkylol, ortho phthalamidic acid.

11. The composition of claim 6 wherein the said insecticidal composition contains from 0.01 to 10 per cent by weight of said calcium N-alkyl, N-alkylol phthalamidic acid salt.

12. The composition of claim 3 wherein the said insecticidal composition contains from 0.01 to 10 per cent by weight of said calcium N-dodecyl, N-propanol ortho phthalamidic acid salt.

13. The composition of claim 8 wherein the said insecticidal composition contains from 0.01 to 10 per cent by weight of said calcium N-dodecyl, N-propanol ortho phthalamidic acid salt.

14. The composition of claim 9 wherein the said insecticidal composition contains from 0.01 to 10 per cent by weight of said calcium N-dodecyl, N-propanol ortho phthalamidic acid salt.

HERSCHEL G. SMITH.
MARK L. HILL.
TROY L. CANTRELL.

REFERENCES CITED

The following references are of record in the file of this patent:

UNITED STATES PATENTS

| Number    | Name         | Date          |
|-----------|--------------|---------------|
| 2,408,103 | Smith et al. | Sept. 24, 1946 |
| 2,436,919 | Gertler et al. | Mar. 2, 1948 |

OTHER REFERENCES

Gersdorff et al.: J. Econ. Ent., vol. 37, No. 1, Feb. 1944, page 137.

Goodhue: Committee on Medical Research of the OSRD Insect Control Committee Report No. 11, Summary of Interim Report Nos. 1–4, Jan. 19, 1945, OEMcmr M-4331, Sec. 2, pages 1–3.